2,788,269
PREPARATION OF AMMONIUM SULFATE

Albert L. Burwell, Norman, Okla., assignor to University of Oklahoma Research Institute, a corporation of Oklahoma No Drawing. Application September 15, 1952, Serial No. 309,737

11 Claims. (Cl. 71—63)

It is known that a primary and one of the most fully developed uses for calcium sulfate or gypsum is its use as the source of sulfate radical for the manufacture of ammonium sulfate for fertilizer compositions and the like by double decomposition with ammonium carbonate in aqueous solution. It is also known that although the process chemically is simple, in actual production the most complex chemical engineering difficulties are encountered. Large quantities of slurries have to be handled in the primary reaction itself, involving problems of stirring and the prevention of sedimentation, and during evaporation of the solution care must be taken to avoid discoloration. Another matter of great concern is that most careful control is required to obtain the desired crystal form. Since the reaction is reversible it is necessary that incoming liquor, strong in ammonium carbonate shall not be immediately diluted with liquor containing very little ammonium carbonate. Because of this, elaborate equipment and valving systems are required. Also, by reason of the reversibility of the reaction, calcium carbonate if allowed to remain in subsequent stages will be reconverted into calcium sulfate. Because of these and other difficulties the process though old has only recently been widely used.

By the practice of this invention many of the difficulties encountered in preparing ammonium sulfate by maintaining a slurry are eliminated. I have discovered, quite unexpectedly, that it is possible to react calcium sulfate with ammonium carbonate or ammonium bicarbonate in the absence of added water. I have also discovered that gypsum ($CaSO_4.2H_2O$) can be reacted with gaseous ammonia and carbon dioxide in the absence of added water.

Since there are other modifications of my invention, the invention can best be described with reference to the following equations.

(1) $CaSO_4 + (NH_4)_2CO_3 \rightarrow CaCO_3 + (NH_4)_2SO_4$
(2) $CaSO_4 + 2(NH_4)HCO_3 \rightarrow CaCO_3 + (NH_4)_2SO_4 + H_2O + CO_2$
(3) $CaSO_4 \cdot 2H_2O + 2NH_3 + CO_2 \rightarrow CaCO_3 + (NH_4)_2SO_4 + H_2O$
(3a) $CaSO_4 \cdot 1/2H_2O + 2NH_3 + CO_2 + 1/2H_2O \rightarrow CaCO_3 + (NH_4)_2SO_4$
(3b) $CaSO_4 + 2NH_3 + CO_2 + H_2O \rightarrow CaCO_3 + (NH_4)_2SO_4$ Where ammonium carbonate or bicarbonate is used as in Equations 1 and 2 above, the calcium sulfate employed can be anhydrous, the hemihydrate or the dihydrate. If the calcium sulfate is hydrated, however, the reaction mixture will contain water. When gaseous ammonia and carbon dioxide are employed in accordance with this invention a stoichiometric amount of water must be present.

In the case of gypsum in Equation 3 more than the stoichiometric amount of water is present as the water of hydration. Hence the reaction mixture will contain one mol of water per mol of $CaSO_4 \cdot 2H_2O$ reacted. In Equation 3a wherein the hemihydrate is used, and in Equation 3b wherein the anhydrite is used one-half, and one mol respectively of water must be used per mol of calcium sulfate as shown by the equations. However, since this quantity is less than the water of hydration of calcium sulfate there will still be no aqueous phase present.

Thus it is my discovery that if calcium sulfate is mixed with ammonium carbonate or bicarbonate in a closed vessel, and if the temperature is raised above the dissociation temperature of ammonium carbonate, a reaction will take place. The dissociation temperature of the several ammonium carbonates are reported to lie in the range between 38° C. and 58° C. Since care should be taken to prevent the decomposition of ammonium sulfate formed, the upper temperature limit should not exceed the temperature at which a substantial amount of decomposition occurs. It has been found that ammonia is liberated from ammonium sulfate at 100° C. This temperature has therefore been given as the dissociation temperature of ammonium sulfate.

If anhydrous calcium sulfate is heated with dry ammonium carbonate above the dissociation temperature of ammonium carbonate but below the dissociation temperature of ammonium sulfate, the pressure will increase due to the elevated temperature and to the partial pressure of gaseous materials formed. The reaction product is a mixture of ammonium sulfate and calcium carbonate in the form of a dry powder.

If ground gypsum is subjected to the simultaneous action of carbon dioxide and ammonia gas at temperatures above 58° C. and below 100° C., preferably with agitation, a product results which on drying at atmospheric temperature is the same as that produced by the action of anhydrous calcium sulfate and ammonium carbonate. Since gypsum contains 2 molecules of water of hydration per molecule of $CaSO_4$, whereas only one is required for the reaction the remaining water can be removed by drying. If calcium sulfate anhydrite or calcium sulfate hemihydrate, is used instead of gypsum it is necessary to introduce a small amount of water, e. g. a stoichiometric amount, namely one mol of water per mol of calcium sulfate in the case of the anhydrite, or one-half mol of water per mol of calcium sulfate in the case of the hemihydrate.

In carrying out the reaction in accordance with this invention similar results are obtained whether a dry calcium sulfate and ammonium carbonate are used or gaseous ammonia and carbon dioxide with hydrated calcium sulfate, e. g. gypsum, or with calcium sulfate anhydrite and water vapor. By using gypsum and ammonia in theoretical proportions but doubling the amount of carbon dioxide theoretically required relatively complete conversions, say about 90 percent can be obtained. By using theoretical proportions of ammonia and carbon dioxide but a 10 percent excess of gypsum over the theoretical amount conversions of around 85 percent can be obtained. Since the more desired product is ammonium sulfate, it is of course desirable to use more than the theoretical amount of carbon dioxide. Commercially finely powdered gypsum can be agitated, for example, in batch production, in rotating gas-tight drum adapted so that the temperature in its interior can be controlled. Molecular equivalents of calcium sulfate and ammonium carbonate, or of gypsum, ammonia and carbon dioxide, can be introduced into said drum. For continuous production a rotary drier or kiln can be used, constructed with gas and vapor seals, with the feed rate and discharge rate and the temperature carefully controlled. The reaction can also be carried out in an apparatus adapted for fluid type operation. Thus pulverized calcium sulfate can be carried by streams of reacting gases.

The temperature range, as indicated, lies between the dissociation temperature of ammonium carbonate or bicarbonate and that of ammonium sulfate. Desirably temperatures in the upper part of the range, say the upper one-third of said range, are employed, since in some instances reaction times at temperatures around 75° C. may be about five hours. An excess of ammonium carbonate (or of ammonia or carbon dioxide if these gaseous reactants are used), is desirable to drive the reaction sufficiently far to the ammonium sulfate side. This is particularly advantageous since excess carbon dioxide and ammonia will pass through the system unchanged and can be recycled.

As in the case of temperature, pressure will also have some effect upon the reaction. It is desirable to operate at pressures above atmospheric to increase yield and decrease reaction time, particularly since a closed drum will normally be used to prevent oxygen from entering the vessel. Generally speaking any pressure above atmospheric can be used, even up to 1000 pounds per square inch gauge or higher.

The following examples will serve to illustrate various modifications of this invention. Other embodiments will, of course, occur to those skilled in the art having the benefit of this disclosure.

Example I

In an air-tight vessel provided with means for permitting the escape of gaseous products, equimolecular proportions of ammonium bicarbonate and powdered gypsum were mixed. The temperature of the vessel was maintained constant at a temperature between 65° C. and 75° C. After the mixture became heated a small amount of gas (probably carbon dioxide) began to escape. After approximately five hours the escape of gas ceased. The vessel was then cooled, and the contents removed. The reaction products were then allowed to dry at room temperature. The product, a dry white powder, was an intimate mixture of ammonium sulfate and calcium carbonate containing a small amount of unreacted calcium sulfate. This white powder was found to be 44.3 per cent insoluble and 55.7 percent soluble. Theoretically, the product should have consisted of 43.1 percent calcium carbonate (insoluble) and 56.9 percent ammonium sulfate (soluble). The conversion of calcium sulfate to ammonium sulfate was 92 percent. All of the percentages in this disclosure are on a weight basis.

Example II

In this example powder gypsum and ammonium carbonate were reacted at 85° C. in accordance with Example I but under slight pressure. To remove any moisture and unconverted ammonium carbonate the resulting mixture was dried at 85° F. The reaction products were analyzed and the following data were obtained:

|  | Percent |
|---|---|
| CaO | 24.98 |
| CO$_2$ | 18.36 |
| SO$_3$ | 34.17 |

Calculated from the above data the composition of the resulting mixture was as follows:

|  | Percent |
|---|---|
| CaCO$_3$ | 42.1 |
| (NH$_4$)$_2$SO$_4$ | 53.1 |
| CaSO$_4$·2H$_2$O | 4.8 |

This data shows a conversion of approximately 95 percent of the gypsum.

The foregoing examples and disclosure clearly demonstrate the many advantages of operating in accordance with this invention. The marked improvement of the process over the slurry method of reacting calcium sulfate and ammonium carbonate is immediately obvious. Not only are the majority of engineering problems eliminated by operation in accordance with this invention but equipment is simpler, cheaper, and easier to maintain. The mixture of calcium carbonate and ammonium sulfate produced will be dry and ready for shipment or, in some cases, will contain only a small amount of water which can be readily removed by drying. Further, if ammonium sulfate free of calcium carbonate is desired water will extract ammonium sulfate from the mixture. By evaporation of the water extract ammonium sulfate can be obtained. Other modifications will, of course, occur to those skilled in the art, and can be made without departing from the spirit or scope of my invention.

I claim:

1. A process for the production of a mixture of ammonium sulfate and calcium carbonate which comprises reacting at a temperature above 38° C. and below the dissociation temperature of ammonium sulfate a dry compound selected from the group consisting of calcium sulfate and hydrates thereof with a compound selected from the group consisting of (a) dry ammonium carbonate, (b) dry ammonium bicarbonate, and (c) gaseous ammonia, gaseous carbon dioxide and water, the reaction being effected in the dry state in the susbtantial absence of extraneous water in excess of that amount of water required stoichiometrically to combine chemically with the ammonia and carbon dioxide present in the reaction mixture.

2. A process for the production of a mixture of ammonium sulfate and calcium carbonate which comprises reacting dry gypsum with gaseous ammonia and gaseous carbon dioxide at a temperature in the range from about 58° C. to 100° C., the reaction being effected in the dry state in the absence of water other than the water obtained from said gypsum.

3. A process for the production of a dry mixture of ammonium sulfate and calcium carbonate which comprises reacting anhydrous calcium sulfate with dry ammonium carbonate at a temperature above the dissociation temperature of ammonium carbonate and below the temperature of ammonium sulfate, the reaction being effected in the dry state in the absence of water other than the water obtained from the dissociation of said ammonium carbonate.

4. A process for the production of a dry mixture of ammonium sulfate and calcium carbonate which comprises reacting anhydrous calcium sulfate with gaseous ammonia and gaseous carbon dioxide at a temperature in the range from about 38° C. to 100° C. in the presence of about one mole of water per mole of anhydrous calcium sulfate, the reaction being effected in the dry state in the substantial absence of extraneous water in excess of that amount of water required stoichiometrically to combine chemically with the ammonia and carbon dioxide present in the reaction mixture.

5. A process for the production of an intimate dry mixture of ammonium sulfate and calcium carbonate which comprises reacting dry calcium sulfate hemihydrate with gaseous ammonia and gaseous carbon dioxide at a temperature in the range from about 60° C. to 100° C., and in the presence of about one-half mole of water per mole calcium sulfate hemihydrate, the reaction being effected in the dry state in the substantial absence of extraneous water in excess of that amount of water required stoichiometrically to combine chemically with the ammonia and carbon dioxide present in the reaction mixture.

6. A process for the production of ammonium sulfate which comprises reacting anhydrous calcium sulfate with dry ammonium carbonate at a temperature above the dissociation temperature of ammonium carbonate and below that of ammonium sulfate, the reaction being effected in the dry state in the absence of water other than the water obtained from the dissociation of said ammonium carbonate, to form a dry mixture of ammonium sulfate and calcium carbonate, subsequently extracting said mixture with water, and evaporating the water extract to recover ammonium sulfate.

7. A process for the production of ammonium sulfate which comprises reacting dry gypsum with gaseous ammonia and gaseous carbon dioxide at a temperature in the range from about 58° C. to 100° C., the reaction being effected in the dry state in the absence of water other than the water obtained from said gypsum, recovering a mixture of ammonium sulfate and calcium carbonate, extracting said mixture with water, and evaporating the water extract to recover ammonium sulfate.

8. A process for the production of ammonium sulfate which comprises reacting anhydrous calcium sulfate with gaseous ammonia and gaseous cabon dioxide at a temperature in the range from about 38° C. to 100° C. in the presence of about one mole of water per mole of calcium sulfate the reaction being effected in the dry state in the substantial absence of extraneous water in excess of that amount required stoichiometrically to combine chemically with the ammonia and carbon dioxide present in the reaction mixture, recovering a mixture of ammonium sulfate and calcium carbonate, extracting said mixture with water, and evaporating the water extract to recover ammonium sulfate.

9. A process for the production of a fertilizer mixture of ammonium sulfate containing calcium carbonate which comprises intimately mixing dry powdered gypsum and dry ammonium bicarbonate, heating the mixture of reactants for a period of time sufficient to effect substantial conversion to ammonium sulfate, at a temperature in the range from about 65° C. to about 85° C., the reaction being effected in the dry state in the absence of water other than the water obtained from said gypsum and said ammonium bicarbonate, and drying the moist reaction mixture at room temperature.

10. A process for the production of a mixture of ammonium sulfate and calcium carbonate which comprises reacting dry gypsum with gaseous ammonia and an excess of gaseous carbon dioxide at a temperature in the range from about 58° C. to 100° C., the reaction being effected in the dry state in the absence of water other than the water obtained from said gypsum.

11. A process for the production of a mixture of ammonium sulfate and calcium carbonate which comprises reacting a stoichiometric amount of dry gypsum with a stoichiometric amount of gaseous ammonia and an excess of the stoichiometric amount of gaseous carbon dioxide at a temperature in the range from about 58° C. to 100° C., the reaction being effected in the dry state in the absence of water other than the water obtained from said gypsum.

References Cited in the file of this patent

UNITED STATES PATENTS

| | | |
|---|---|---|
| 1,072,840 | Easterfield | Sept. 9, 1913 |
| 1,152,244 | Vis | Aug. 31, 1915 |
| 1,152,245 | Vis | Aug. 31, 1915 |
| 1,758,449 | Liljenroth | May 13, 1930 |
| 1,902,649 | Larsson | Mar. 21, 1933 |
| 2,219,646 | Beecher | Oct. 29, 1940 |

FOREIGN PATENTS

| | | |
|---|---|---|
| 384,392 | Great Britain | Dec. 8, 1932 |